United States Patent
Coffin et al.

(10) Patent No.: US 9,976,443 B2
(45) Date of Patent: May 22, 2018

(54) TURBOFAN ENGINE ASSEMBLY METHODS

(71) Applicant: United Technologies Corporation, Hartford, CT (US)

(72) Inventors: James B. Coffin, Windsor, CT (US); Alessio Pescosolido, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 431 days.

(21) Appl. No.: 14/774,029

(22) PCT Filed: Mar. 14, 2014

(86) PCT No.: PCT/US2014/027512
§ 371 (c)(1),
(2) Date: Sep. 9, 2015

(87) PCT Pub. No.: WO2014/197080
PCT Pub. Date: Dec. 11, 2014

(65) Prior Publication Data
US 2016/0017752 A1    Jan. 21, 2016

Related U.S. Application Data

(60) Provisional application No. 61/786,087, filed on Mar. 14, 2013.

(51) Int. Cl.
*F01D 25/16* (2006.01)
*B64D 29/06* (2006.01)
*F01D 25/28* (2006.01)

(52) U.S. Cl.
CPC ........... *F01D 25/162* (2013.01); *B64D 29/06* (2013.01); *F01D 25/28* (2013.01);
(Continued)

(58) Field of Classification Search
CPC .............................. B64D 29/06; F01D 25/28
See application file for complete search history.

(56) References Cited

U.S. PATENT DOCUMENTS 5,653,351 A    8/1997  Grout et al.
7,568,575 B2   8/2009  Kalantari
(Continued)

FOREIGN PATENT DOCUMENTS

| | | |
|---|---|---|
| EP | 2390472 A2 | 11/2011 |
| EP | 2535528 A2 | 12/2012 |
| JP | 2012520967 A | 9/2012 |

OTHER PUBLICATIONS

International Search Report and Written Opinion for PCT/US2014/027512, dated Dec. 26, 2014.
(Continued)

*Primary Examiner* — Derek D Knight
(74) *Attorney, Agent, or Firm* — Backman & LaPointe, P.C.

(57) ABSTRACT

A method for assembling a turbofan engine (20) comprises coupling a bearing assembly (176) and a shaft (420) as a unit to a bearing support (453). A transmission (46) and the fan shaft (132) are installed to a front frame assembly (172). The bearing assembly and shaft are installed as a unit so that the shaft engages a central gear (52) of the transmission and the bearing support engages the front frame assembly.

15 Claims, 12 Drawing Sheets

(52) U.S. Cl.
CPC ...... *F05D 2220/36* (2013.01); *F05D 2230/60* (2013.01); *F05D 2260/40311* (2013.01)

(56) References Cited

U.S. PATENT DOCUMENTS

| | | |
|---|---|---|
| 7,795,540 B2 | 9/2010 | Yamada et al. |
| 7,955,046 B2 | 6/2011 | McCune et al. |
| 8,439,637 B2 | 5/2013 | DiBenedetto et al. |
| 8,511,987 B2 | 8/2013 | Reinhardt et al. |
| 8,776,360 B2 | 7/2014 | Carcy et al. |
| 2008/0098717 A1 | 5/2008 | Orlando et al. |
| 2011/0056208 A1 | 5/2011 | Norris et al. |
| 2011/0123326 A1 | 5/2011 | DiBenedetto et al. |
| 2011/0286836 A1 | 11/2011 | Davis |
| 2012/0088624 A1 | 4/2012 | Sheridan |
| 2012/0195753 A1 | 8/2012 | Davis et al. |
| 2012/0251306 A1 | 10/2012 | Reinhardt et al. |
| 2012/0257960 A1* | 10/2012 | Reinhardt ............ F01D 25/162 415/122.1 |
| 2012/0260669 A1 | 10/2012 | Davis et al. |
| 2013/0011241 A1 | 1/2013 | Skaustein et al. |

OTHER PUBLICATIONS

European Search Report dated Nov. 10, 2016 for EP Patent Application No. 14807536.9.
Japanese Office action dated Oct. 31, 2016 for JP Patent Application No. 2015-561762.

* cited by examiner

TURBOFAN ENGINE ASSEMBLY METHODS

CROSS-REFERENCE TO RELATED APPLICATIONS

Benefit is claimed of U.S. Patent Application Ser. No. 61/786,087, filed Mar. 14, 2013, and entitled "Turbofan Engine Assembly Methods", the disclosure of which is incorporated by reference herein in its entirety as if set forth at length. Ser. No. 13/524,527, filed Jun. 15, 2012, and entitled "Engine Bearing Support" is a Continuation-in-Part of Ser. No. 12/622,535, filed Nov. 20, 2009, and entitled "Bellows Preload and Centering Spring for a Fan Drive Gear System" and claims benefit of U.S. Patent Application Ser. No. 61/498,515, filed Jun. 17, 2011, and entitled "Fan Rotor Support" and U.S. Patent Application Ser. No. 61/593,181, filed Jan. 31, 2012, and entitled "Engine Bearing Support", the disclosures of which are incorporated by reference herein in their entireties as if set forth at length.

BACKGROUND

The disclosure relates to gas turbine engines. More particularly, the disclosure relates to turbofan engines with speed reducing transmissions. Two references disclosing a recent turbine engine configuration are U.S. Pat. Nos. 8,439,637 and 8,511,987, respectively issued May 14, 2013 and Aug. 20, 2013.

A number of turbine engine manufacturing apparatus and methods are known. One method is shown in U.S. Pat. No. 7,955,046 issued Jun. 7, 2011. Various associated assembly apparatus are shown in U.S. Pat. No. 7,795,540 issued Aug. 24, 2010, U.S. Pat. No. 5,653,351 issued Aug. 5, 1997, and U.S. Pat. No. 7,568,575 issued Aug. 4, 2009.

SUMMARY

One aspect of the disclosure involves a method for assembling a turbofan engine. The engine comprises: an engine case; a gaspath through the engine case; a fan having a circumferential array of fan blades; a fan case encircling the fan blades radially outboard of the engine case; a plurality of fan case vanes extending outward from the engine case to the fan case; a front frame assembly comprising a plurality of vanes extending radially across the gas path; a shaft; a transmission coupling the shaft to a fan shaft to drive the fan; a bearing assembly coupling the shaft to the front frame assembly; and a bearing support extending aftward and radially inward from the front frame assembly to the bearing assembly. The method comprises: coupling the bearing assembly and the shaft as a unit to the bearing support; installing the transmission and fan shaft to the front frame assembly; installing the bearing assembly and shaft as a unit so that the shaft engages a central gear of the transmission and the bearing support engages the front frame assembly.

A further embodiment may additionally and/or alternatively include installing an inlet guide vane assembly after the bearing support is engaged to the front frame assembly.

A further embodiment may additionally and/or alternatively include the shaft being a coupling.

A further embodiment may additionally and/or alternatively include the coupling of the bearing assembly and the shaft as a unit to the bearing support comprising lowering the bearing assembly and the shaft as a unit into the bearing support.

A further embodiment may additionally and/or alternatively include the installing of the transmission and the fan shaft to the front frame assembly comprising lowering the transmission and the fan shaft.

A further embodiment may additionally and/or alternatively include the installing the transmission and the fan shaft further comprising securing via bolts inserted from below.

A further embodiment may additionally and/or alternatively include rotating the transmission and the fan shaft by 180° about a transverse axis to orient the transmission and the fan shaft in a front-downward orientation in which the bearing assembly and shaft are installed.

A further embodiment may additionally and/or alternatively include the installing the bearing assembly and shaft as a unit comprising lowering the bearing assembly and shaft.

Another aspect of the disclosure includes a turbine engine subassembly or turbine engine comprising: a transmission; an output shaft coupled to the transmission; an input shaft coupled to the transmission; a fingered flexure coupled to the transmission for resisting rotation of a gear carrier of the transmission; a front frame assembly at least partially encircling the transmission; a bearing support; and a bearing coupling the bearing support to the input shaft. From forward to aft, respective flanges of the fingered flexure, front frame assembly, and bearing support are secured in a sandwich with fasteners. A first O-ring seals between a forwardly protruding collar portion of the bearing support protruding forwardly of the bearing support flange and a rearwardly protruding collar portion of the flexure flange. A second O-ring seals between an outer diameter (OD) rim of the flexure flange and an adjacent inner diameter (ID) face of the front frame assembly.

A further embodiment may additionally and/or alternatively include: the fasteners being head rearward/shank forward bolts; and the bolts being engaged to threaded portions of the flange of the fingered flexure, extending freely through holes in the flanges of the bearing support and front frame assembly.

A further embodiment may additionally and/or alternatively include dowels registering the flanges together.

A further embodiment may additionally and/or alternatively include additional bolts, smaller in count than the bolts, holding the flanges of the fingered flexure and the front frame assembly to each other but not the flange of the bearing support.

A further embodiment may additionally and/or alternatively include the input shaft being a coupling of a low shaft; and the engine further includes a high shaft.

Another aspect of the disclosure includes a turbine engine subassembly or turbine engine comprising: a transmission; an output shaft coupled to the transmission; an input shaft coupled to the transmission; a fingered flexure coupled to the transmission for resisting rotation of a gear carrier of the transmission; a front frame assembly at least partially encircling the transmission; a bearing support; and a bearing coupling the bearing support to the input shaft. From forward to aft, respective flanges of the fingered flexure, front frame assembly, and bearing support are secured in a sandwich with bolts. Additional bolts, smaller in count than the bolts, hold the flanges of the fingered flexure and the front frame assembly to each other but not the flange of the bearing support.

Another aspect of the disclosure involves a method for assembling an engine as herein described with reference to the accompanying drawings.

Another aspect of the disclosure involves an engine as herein described with reference to the accompanying drawings.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
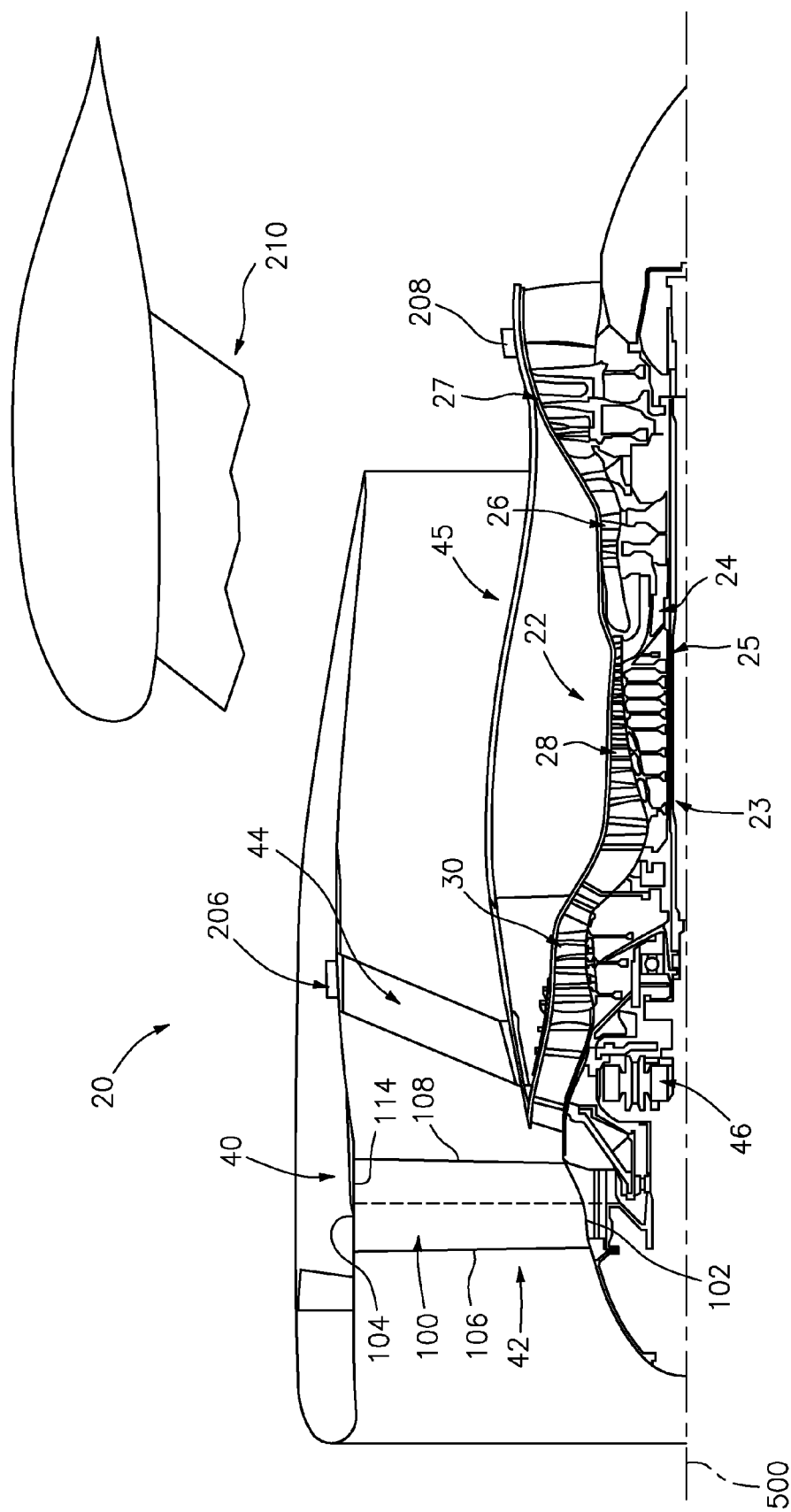
FIG. 1 is a longitudinal axial sectional/cutaway view of an embodiment of a turbofan engine.

FIG. 1 shows an engine based on the configurations shown in U.S. patent application Ser. No. 12/622,535, filed Nov. 20, 2009, and entitled "BELLOWS PRELOAD AND CENTERING SPRING FOR A FAN DRIVE GEAR SYSTEM" and Ser. No. 61/498,515, filed Jun. 17, 2011, and entitled "Fan Rotor Support", the disclosures of which are incorporated by reference in their entireties herein as if set forth at length.

FIG. 1 shows a turbofan engine 20 having an engine case 22 containing a rotor shaft assembly 23. An exemplary engine is a high-bypass turbofan. In such an engine, the normal cruise condition ratio of air mass flowing outside the core (e.g., the compressor sections and combustor) to air mass passing through the core (the bypass ratio) is typically in excess of about 4.0 and, more narrowly, typically between about 4.0 and about 16.0. Via high 24 and low 25 shaft portions of the shaft assembly 23, a high pressure turbine (HPT) section 26 and a low pressure turbine (LPT) section 27 respectively drive a high pressure compressor (HPC) section 28 and a low pressure compressor (LPC) section 30. The engine extends along a longitudinal axis (centerline) 500 from a fore end to an aft end. Adjacent the fore end, a shroud (fan case) 40 encircles a fan 42 and is supported by vanes 44. An aerodynamic nacelle around the fan case is shown and an aerodynamic nacelle 45 around the engine case is shown.

Although a two-spool (plus fan) engine is shown, an alternative variation involves a three-spool (plus fan) engine wherein an intermediate spool comprises an intermediate pressure compressor (IPC) between the LPC and HPC and an intermediate pressure turbine (IPT) between the HPT and LPT. In another aspect a three-spool engine, the IPT drives a low pressure compressor while the LPT drives a fan, in both cases either directly or indirectly via a transmission mechanism, for example a gearbox.

In the exemplary embodiment, the low shaft portion 25 of the rotor shaft assembly 23 drives the fan 42 through a reduction transmission 46. An exemplary reduction transmission is an epicyclic transmission, namely a planetary or star gear system.

Figure 5:
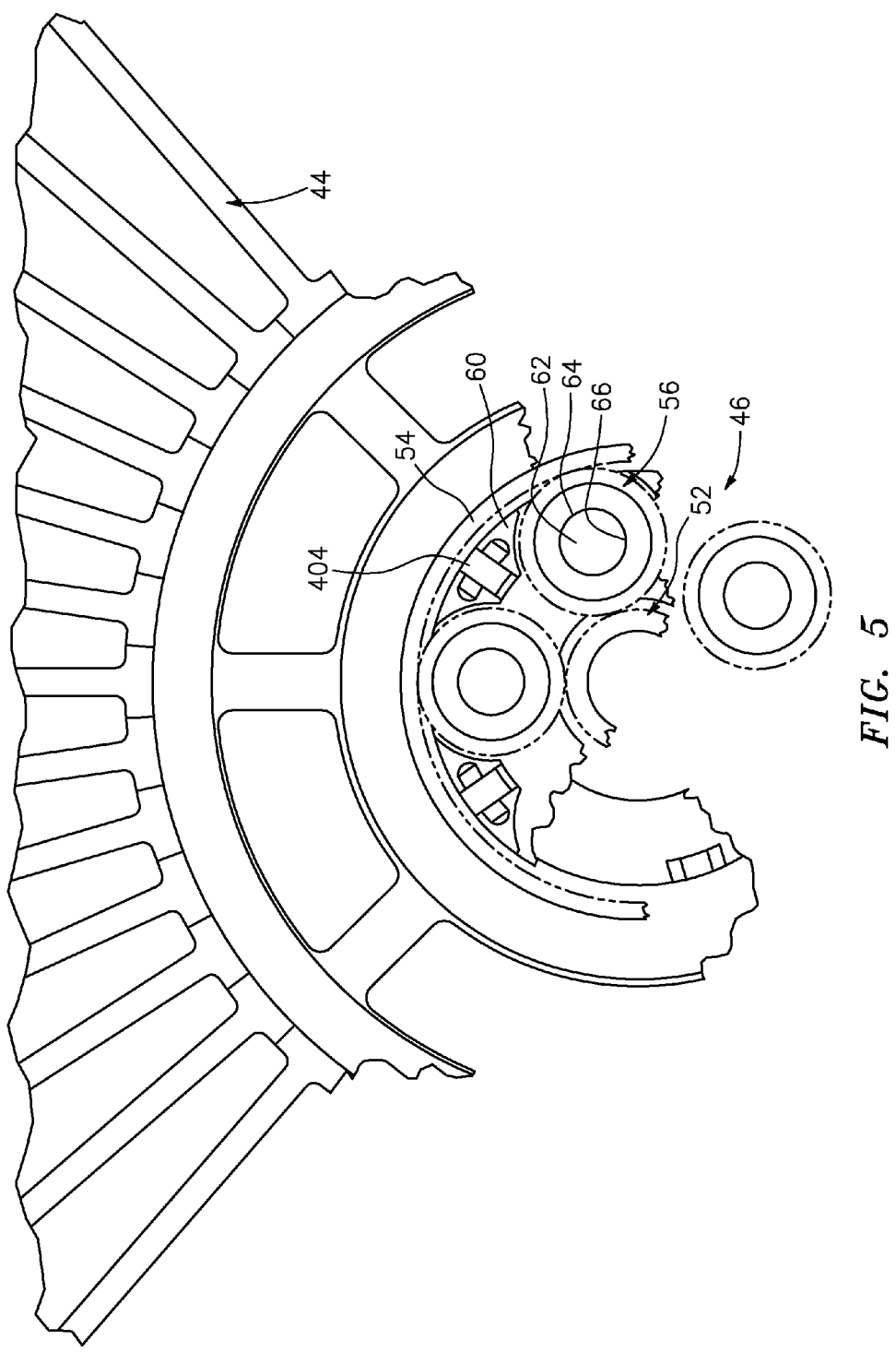
FIG. 5 is partial transverse sectional/cutaway view of a forward portion of the engine of FIG. 1.

FIG. 5 schematically shows details of the exemplary transmission 46. A forward end of the low shaft is coupled to a sun gear 52. The externally-toothed sun gear is encircled by an internally-toothed ring gear 54. The exemplary ring gear is coupled to the fan to rotate with the fan as a unit.

A number of externally-toothed star gears 56 are positioned between and enmeshed with the sun gear and ring gear. A cage or star carrier assembly 60 carries the star gears via associated journals 62. The exemplary star carrier is substantially non-rotatably mounted relative to the engine case 22. The journals have circumferential surface portions 64 closely accommodated within internal bore surfaces 66 of the associated star gears.

Other combinations of which of the sun, star carrier and ring are mounted to the fan, low shaft, fixed structure (case) (or are permitted to rotate freely) are possible.

The speed reduction ratio is determined by the ratio of diameters of the ring gear to the sun gear. This ratio will substantially determine the maximum number of star gears in a given ring. The actual number of star gears will be determined by stability and stress/load sharing considerations. An exemplary reduction is between about 2:1 and about 13:1. An exemplary number of star gears is between about 3 and about 11.

The fan comprises a rotor having a plurality of aerodynamic blades 100 (FIG. 1) arrayed around the centerline 500. The fan provides the primary motive air flow to the gas generator air stream (the core flow) and the fan duct flow (the bypass flow). Air exiting the fan rotor has increased pressure and axial and tangential flow velocity. The bypass flow velocity may be redirected or straightened by the structural guide vanes 44. The fan blade airfoils extend from inboard ends 102 to outboard tips 104, and have a leading edge 106, a trailing edge 108, a pressure side, and a suction side. The tips are in close facing proximity to a rub strip 114 along the interior of the fan case.

Figure 2:
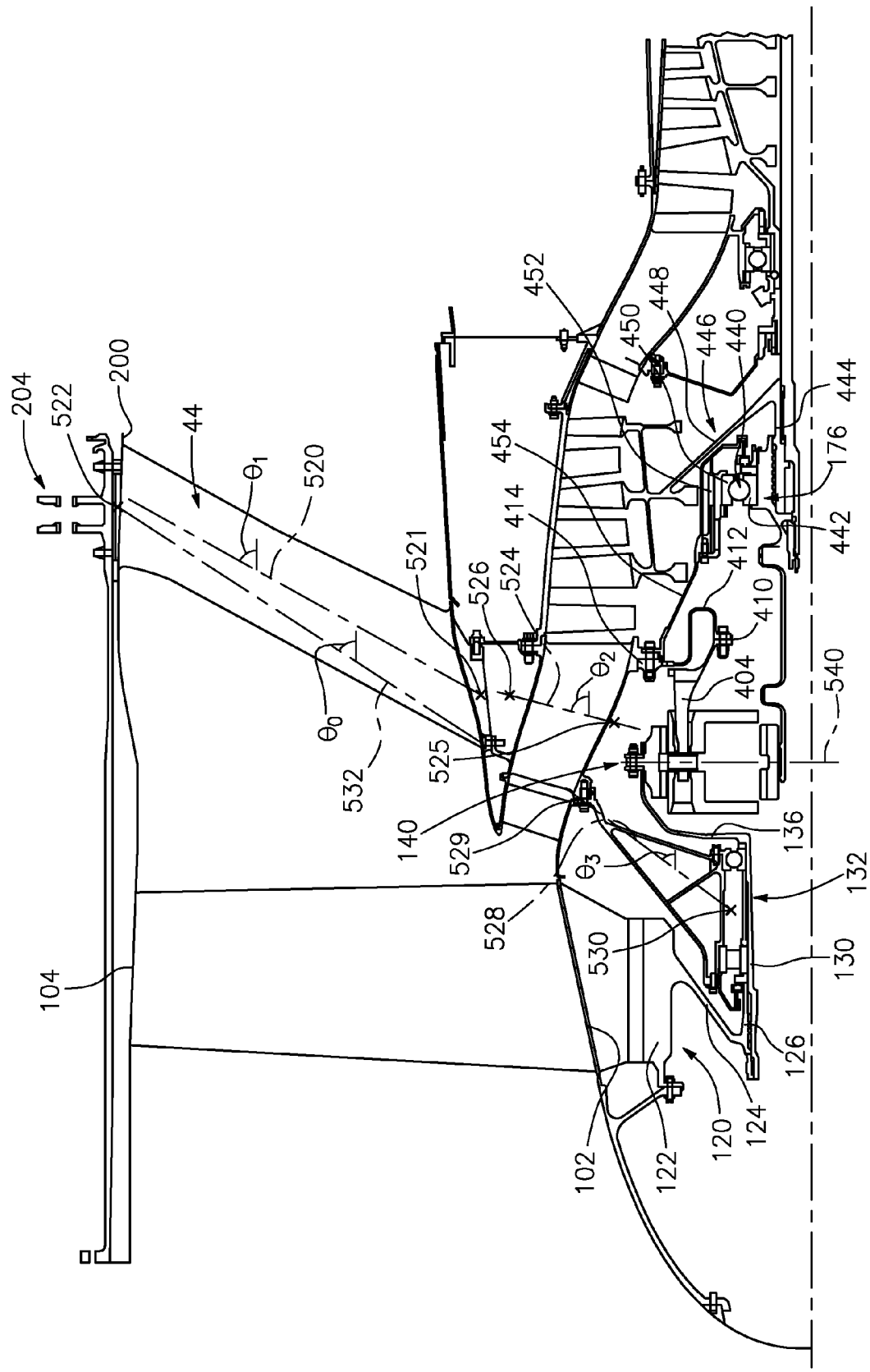
FIG. 2 is a longitudinal axial sectional/cutaway view of a forward portion of the engine of FIG. 1.

At the inboard ends 102, the blades (if separate) are attached to a fan disk 120 (FIG. 2) which transmits torque to the blades and provides support and retention to the blades. The exemplary disk comprises an outer ring 122 to which the blades are attached and a forwardly, inwardly tapering web 124. At its inboard end, the web 124 joins a collar 126 which receives a forward portion 131 of a tubular portion 130 of a fan shaft 132 (e.g., via splined interfitting). At a rearward end, the fan shaft tubular portion joins a partially radial web or hub 136 which extends outward and then axially aftward and is secured to a bolting flange 140 on the periphery of the ring gear. As is discussed below, the fan shaft, via this web 136, both receives torque from the LPT (via the transmission) and provides radial and axial positioning to the transmission.

Figure 3:
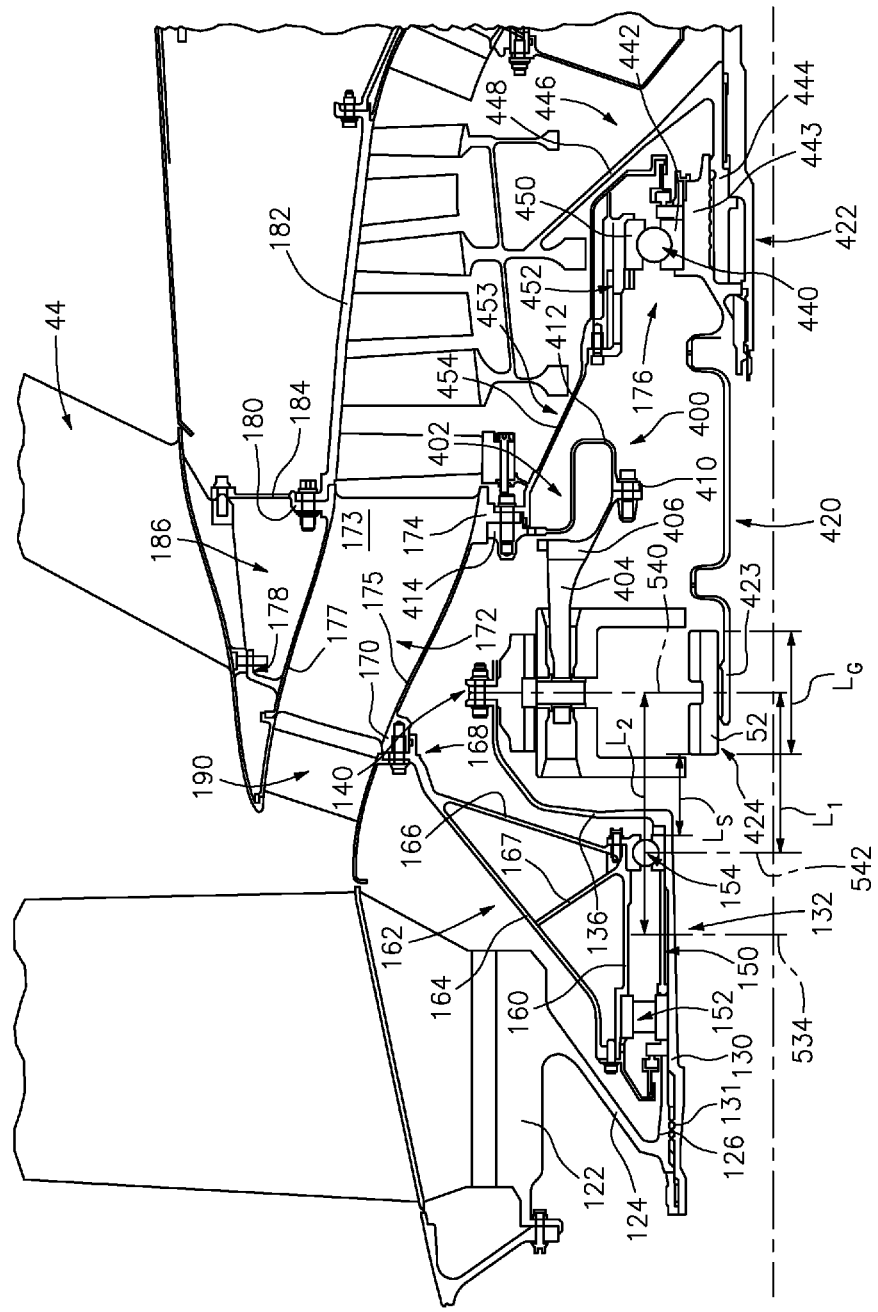
FIG. 3 is a longitudinal axial sectional/cutaway view of a forward portion of the engine of FIG. 1.

As shown in FIG. 3, the fan shaft is surrounded and supported by a duplex bearing system 150 (e.g., having a forward bearing 152 and an aft bearing 154 spaced apart and as described in the '535 application noted above). As in the '535 application, a bellows spring may engage an outer race of at least one of the bearings of the duplex tapered roller bearing. The fan shaft thus joins inner races of the two bearings. The outer races of the two bearings are joined by a tubular radially inboard portion 160 of a fan rotor bearing support structure 162 (forward hub structure). The fan rotor bearing support structure includes a forward web 164 extending outward and aftward from an inboard end of the tubular structure 160 at an exemplary angle in the vicinity of 45°. The aft web 166 extends from an aft end of a tubular portion 160 and also extends aftward and outward but at a more radial inclination. The two webs 164, 166 join at a root of an outboard/aft mounting flange 168. As is discussed further below, the fan rotor bearing support structure 162 supports all degrees of freedom of the fan while allowing rotation about the centerline. FIG. 3 also shows a rearwardly converging web 167 joining the web 164 to a rear inboard end of the web 166 and rear end of tubular structure 160.

The flange 168 is mounted to a mating flange 170 of a front frame assembly (front centerbody) 172 (e.g., shown having a circumferential array of struts (e.g., airfoil-shaped structures) 173 substantially smaller in number than the vanes 44). This assembly includes radial struts across the core flowpath between inner wall 175 and outer wall 177 (at respective inboard and outboard boundaries of the core flowpath). The assembly 172 has an inboard rear bolting flange 174 which, as is described further below, is coupled to the star carrier and to a low shaft forward bearing assembly 176. The assembly 172 has an outboard forward mounting flange 178 to which inboard forward portions of the vanes 44 are mounted. The assembly 172 has an outboard rear mounting flange 180 to which an engine case segment 182 is mounted and which, via a radial web 184, is mounted to inboard rear portions of the vanes 44.

The four-sided (viewed in section) structure 186 formed by the outer structures of assembly 172, inner structures of vanes 44 form an annular box beam often called a torque box. The torque box accumulates loads in all degrees of freedom from the radial core strut assembly 172 and distributes loads in all degrees of freedom to the vane array 44. The torque box structure is especially efficient in transmitting torsion loads about the engine centerline and trunion moments normal to the engine centerline. The torsion and trunion moments place three degrees of bending load into the vane 44 and strut assembly 172 airfoil shaped structures 173. Alternatively torque box 186 could be a three-sided structure.

A structural load path is thus provided through the fan hub support, the frame strut assembly, the array of vanes 44, to the engine case (and, at least in the exemplary embodiment to a pylon 210).

FIG. 3 shows an array of fan exit stator vanes 190 positioned ahead of the fan frame. These remove swirl from exiting from proximal portion to the fan blades. Such vanes may be integrated into the fan frame in alternative implementations.

The exemplary vanes 44 have a characteristic line 520 (FIG. 2) (e.g., a linear fit to the median of the airfoil shape) at an angle $\theta_1$ relative to the engine centerline 500. The exemplary $\theta_1$ is less than 75° relative to the engine centerline, more narrowly, 55-70°. Alternatively defined, an angle in such a range may be along a majority of the leading and/or trailing edges of the vanes or may be along a majority of the axial span of a median. Such an angle may alternatively be characterized as essentially the angle between centers 521 and 522 respectively of inboard and outboard mounting points or of inboard and outboard ends of the airfoil portion of the vane. If the vanes are canted, such an angle may be a projection onto an intersecting axial/radial plane.

A similarly defined line 524 of the front frame strut assembly (passing through a center 525 of inboard flanges of the airfoil shaped structures 173 and a center 526 of outboard flanges thereof) is at an angle $\theta_2$ relative to the engine centerline. Exemplary $\theta_2$ is steeper (e.g., 70-85°).

A line 528 between a location 529 along a mating face of the outboard flange of the fan rotor bearing support and a center 530 (of the axial half section (along bearing transverse centerplane 534) (as shown in FIG. 3) of its bearing system is shown at an angle $\theta_3$ relative to the engine centerline. Exemplary $\theta_3$ is in a similar range to $\theta_1$ above.

A line 532 extends from the bearing center 530 to the location 522 or center of the outboard end of the airfoil of the vane 44. The line is at an angle $\theta_0$ relative to the engine centerline. Exemplary $\theta_0$ is slightly less than $\theta_1$. For example, exemplary $\theta_0$ is about 5° less than $\theta_1$. More broadly, exemplary $\theta_0$ is between 15° less and 5° more than $\theta_1$. An exemplary range is 50-70°.

The combination of angles, most notably $\theta_1$ and $\theta_3$ is such that the force transmission path from the fan bearing system to the fan case stays relatively close to the line 532 (and to the cone represented by revolving that line about the centerline). The line 532 thus locally falls within or nearly within the airfoil of the vane 44 so that fan rotor shear and overturning trunion moments are transmitted in an efficient straight line conical path through vane 44. (e.g., the line 532 does not go more than half of the local chord of the airfoil ahead of the airfoil at any point along the airfoil, more narrowly 20%). Vane 44 is thus load more predominantly in tension or compression. If vane 44 central line 520 is further off the line 532, a given load will induce greater internal bending moments in vane 44. The conical frame structural arrangement therefore, in various embodiments, carries the dominating fan rotor loads more efficiently. The more efficient structure is also stiffer and controls fan blade tip clearances more effectively. Tighter fan tip clearances improve engine performance.

As shown in FIG. 3, centerplane 540 of the gears may be located at a very minimal distance $L_1$ from the rear fan bearing 154 centerplane 542 by sharply curving the fan shaft hub 136. Exemplary centerplane-to-centerplane distance $L_1$ is less than about twice the gears' axial length $L_G$, more narrowly, less than about 1.5 times, with an axial spacing $L_S$ between the adjacent ends of the gears and bearing 154 less than the gear length $L_G$. The centerplane 540 may be a distance $L_2$ aft of the center 534 of the fan bearing system of less than about 3.0 times the gear length $L_G$, more narrowly less than about 2.5 times or about 2.0 times.

Figure 4:
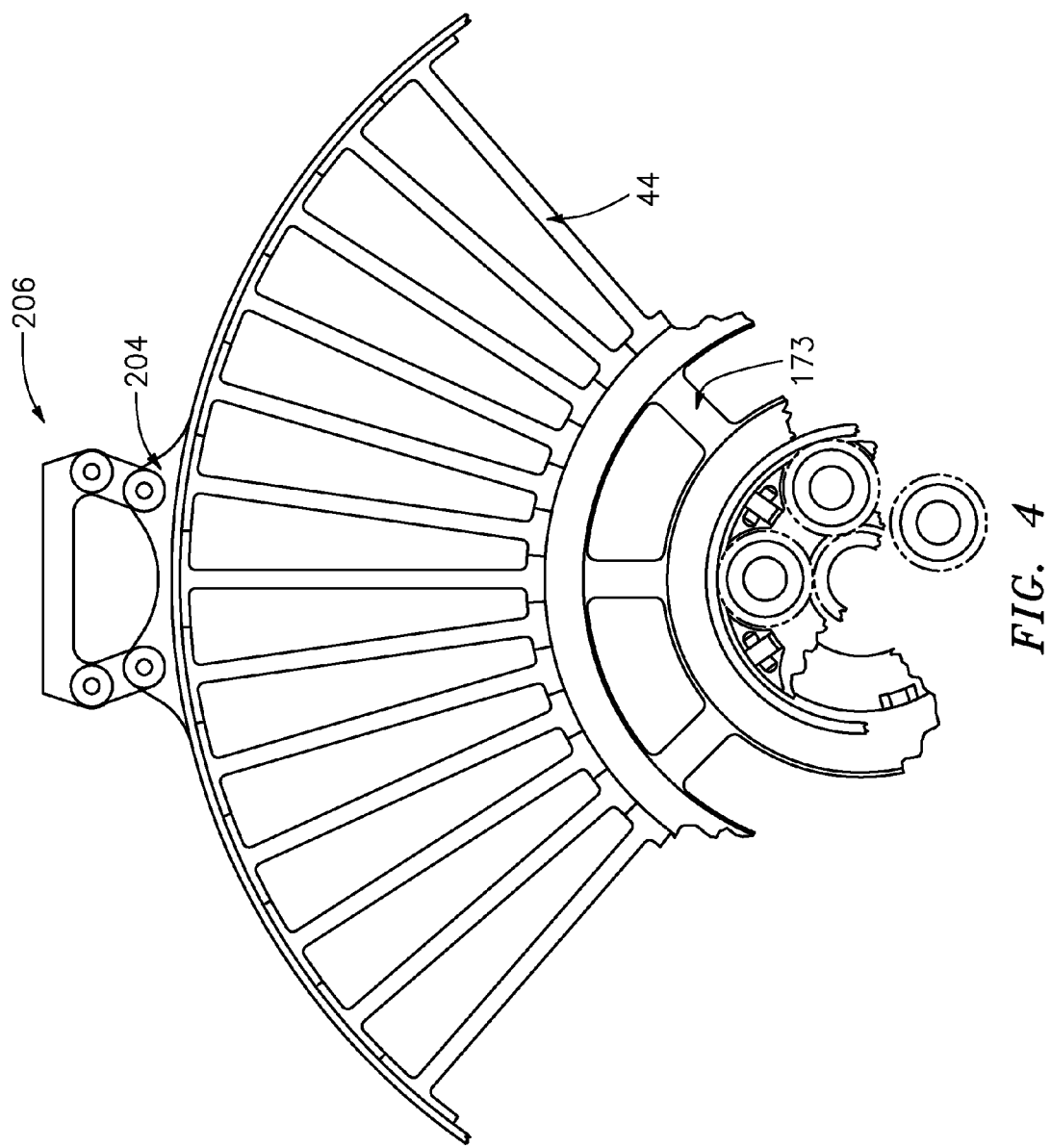
FIG. 4 is partial transverse sectional/cutaway view of a forward portion of the engine of FIG. 1.

At their outboard ends, the vanes 44 have flanges 200 bolted to an inner ring structure of the fan case to tie the outboard ends of the vanes together. Integral therewith or fastened thereto is a forward mounting structure 204 (e.g., clevises which form part of a four bar mechanism 206 (FIG. 4)) and provides forward support to the engine (e.g., vertical and lateral support).

To mount the engine to the aircraft wing, the pylon 210 is mounted to the mechanism 206 (FIG. 4) (e.g., forming the outer part thereof). The pylon is also mounted to a rear engine mount 208.

The exemplary carrier 60 is held by a flanged flexure structure 400 against rotation about the centerline. The exemplary flanged flexure structure 400 comprises a body 402 mounted to the case and a plurality of fingers 404 extending forward from a ring 406 bringing the body 402 into engagement with the carrier 60 (FIG. 5). The exemplary fingers 404 extend into corresponding apertures in the carrier 60 and are secured via radial pinning near their distal ends. Proximal end portions of the fingers are secured to or unitarily formed with the ring 406 which is bolted to an inboard flange 410 of the body. The flexure has a flexible portion 412 extending in convoluted axial cross-section to an outboard flange 414 bolted to the aft inboard flange 174 of the front frame strut assembly. The flexure, via the fingers, thus retains the carrier 60 against all but small (e.g., vibratory level) rotational movements about the axis 500 while allowing the carrier 60 to otherwise accommodate engine distortion due to thrust loads. Thus, the flange structure and its flexure transmit all or the majority of axial retention torque to the star carrier but do not transmit a majority of axial and radial retention forces to the star carrier 60.

A fan drive input coupling (input shaft) 420 (FIG. 3) couples the sun gear 52 to the forward portion 422 of the low shaft 25. A forward/distal portion 423 of the coupling 420 is received in the bore (interior) 424 of the sun and irrotatably secured thereto (e.g., via splined interfitting). The coupling 420 has sufficient axial and radial compliance so that it effectively only transmits torque about the centerline but allows other angular excursions and position excursions.

Radial support of the low shaft is provided by a plurality of bearing systems. The exemplary forwardmost bearing assembly 176 is a thrust bearing system near the forward end of the shaft. The exemplary thrust bearing system includes a bearing 440 that has an inner race 442 mounted to and encircling a proximal (rear end) portion 443 of the fan drive input coupling 420 at a forward end of the low shaft. A collar 444 of a hub 446 of the LPC rotor is sandwiched between the shaft and the input coupling proximal portion. The web 448 of the hub 446 extends radially outwardly and forwardly from a junction with an aft end of the collar 444 to join with a web of a disk (the middle of three disks in the example) of the LPC rotor. The outer race 450 of the bearing assembly 176 is mounted to a ring structure 452. A bearing support 453 having a shallow web 454 extends forward and outward from a bolted joint with the ring structure to the bolted joint with the inboard aft flange 174 of the front frame strut assembly. The exemplary web 454 is relatively shallow (e.g., at 10-45° off axial, more narrowly, or 10-40° or 10-35° or 20-40° or 20-35°). Similar angular ranges may exist for angles measured between the center of the forward bolt circle 479 (FIG. 3) of flange 480 or other mounting feature of the bearing support at the forward/outboard end of the web 454 and the center 571 of the individual bearings of the bearing 440 (e.g., the intersection of their rotational axes with the centerplane 570 of the bearing 440 as a whole). The centerplane 570 of the bearing 440 (FIG. 3) may be within an aft half of the longitudinal span $L_{LC}$ of the low rotor (e.g., measured between forward and aft extremities of the first and last stage blades thereof).

The tapering of the hub/web 454 helps facilitate longitudinal compactness by allowing the bearings 440 to be shifted aft and make longitudinal room for the transmission and coupling 420, etc. This may have the effect of shifting the bearings 440 further longitudinally into the low pressure compressor (LPC) section (e.g., so that the centerplane of the bearing 440 may fall within the LPC and, more narrowly, even within the hub 446 and its web 448). Alternatively, at least some portion of the bearing structure will be within the web 448 if not the bearing centerplane. The tapering of the web 448 also facilitates this. In the example, the entire bearing assembly 176 is longitudinally within the LPC rotor.

The various features above and further features below may be implemented in the contexts of reengineering a given directly-driven turbofan engine to add a transmission, reengineering a turbofan engine already having a transmission or reengineering a non-turbofan engine to become a turbofan (e.g., using an existing engine configuration as the basis of the turbofan's gas generator). Relative to a baseline directly-driven turbofan, use of a reduction transmission may allow reduction of engine turbomachinery stage count by allowing the fan to rotate at lower speeds than the LPT. It also permits larger fan diameters, higher engine propulsive efficiency, and lower noise. It also adds complexity to the engine shaft and bearing compartment arrangement. The higher bypass ratio of the larger fan permits a smaller gas generator. Increase in rotor system complexity in conjunction with reduced axial and radial space inside the turbomachinery creates bearing compartment packaging challenges.

The presence of the transmission softens the trunion stiffness between the fan rotor and the low shaft. The engine propulsor (fan rotor, transmission, fan frame, and fan containment case) may, in some engines, comprise half the turbomachinery weight. The propulsor deflects under load as a unit and moves somewhat independently from the gas generator (compressor(s), combustor, turbine(s)). Flexible input shaft coupling and static gear carrier supports are used to isolate these deflections. However excessive deflection in these flexures can cause high cycle fatigue in the flexures and impart increased misalignment loads into the transmission.

The tolerance loop between the low shaft and the sun gear can become quite large if the low shaft is supported through the intermediate frame, LPC, and the front frame. This tolerance offset introduces a constant lateral load the FDGS flexible structures.

If the low shaft is supported through the intermediate frame, the intermediate frame bearing compartment might otherwise require a significant length increase to accommodate the associated components (e.g., accessory drive tower shaft, two bearings, two oil seals to the static structure and one intershaft oil seal). Intershaft oil seals can be unreliable at the high speeds of the small gas generator. The size of this bearing compartment can become quite large and set the length of the turbomachinery in this engine region.

The front frame 172 supports fan thrust and radial loads via the forward hub structure 162 and low shaft thrust and radial loads via the bearing support 454. By supporting the front end of the low shaft directly through the front frame, the low shaft is forced to deflect with the front frame and the remainder of the propulsor. Reduction in the slope and lateral deflections reduces gear mesh wear forces and improves the high cycle fatigue life of the flexible input shafting. Lateral deflections of the sun gear are matched by lateral deflections of the low shaft. The low rotor thrust bearing 440 provides significant trunion stiffness between the low shaft and the bearing support 454. As the low shaft bearing support 454 is rotated by the front frame 172, the front end of the low shaft is forced to bend and maintain slope alignment with the sun gear 52.

Likewise, supporting the front end of the low shaft directly onto the front frame may reduce the number of parts in the tolerance loop between the low shaft and the sun gear. The tolerance mismatch is a constant offset in the flex system that wears the gear teeth and fatigues the flex systems whenever the engine is turning. Improved alignment increases transmission durability.

In various reengineering embodiments, placing the low shaft bearing support on the front frame shortens the engine length and simplifies the oil sealing system (e.g., one statically supported oil seal and one very high speed counter rotating intershaft seal are eliminated from the engine; the LPC rotor hub can be moved aft under the intermediate frame, because the seals are eliminated and the bearing moved in front of the compressor hub). Placement of the LPC hub further aft allows the transmission and the flexible coupling system to move aft. The length of the engine is then set by the aerodynamic constraints of the flowpath and not the underlying rotor structure. The oil sealing durability, reliability, and oil system heat loads may be improved by the seal elimination.

With the low shaft supported by the front frame, there may be the flexibility that the propulsor unit can be disassembled with or without the LPC attached. This flexibility may allow faster access to the both the low and high rotor front bearing compartments, thereby improving assembly, disassembly, and engine maintenance.

The tapering of the web 454 may reduce stiffness. In various embodiments, it may be desirable to stiffen the rotor to raise the natural frequency of the shaft. Possible embodiments involve replacing the bearing assembly 176 with a duplex or modifying it to be duplexed. This duality helps increase the stiffness of interaction between the fixed engine structure (via the web 454) and the front end of the low pressure shaft. The duality thus increases the slope fixity of that end of the shaft which in turn raises the rotor dynamic natural frequency of the engine system and provides more margin.

An exemplary series of steps in the engine assembly process is discussed below. Other steps may be conventional in the art and are not discussed in further detail. In discussing the assembly steps, the directions "forward" and "aft" (or "rearward") are from the point of view of the engine or the component in its final orientation in the engine with the forward direction being parallel to the engine centerline 500 pointing generally from the turbine section(s) to the compressor section(s) and fan. The directions "upward" (also "upper") and "downward" (also "lower") are viewed from the point of view of the gravitational frame of reference in the assembly facility.

Figure 6:
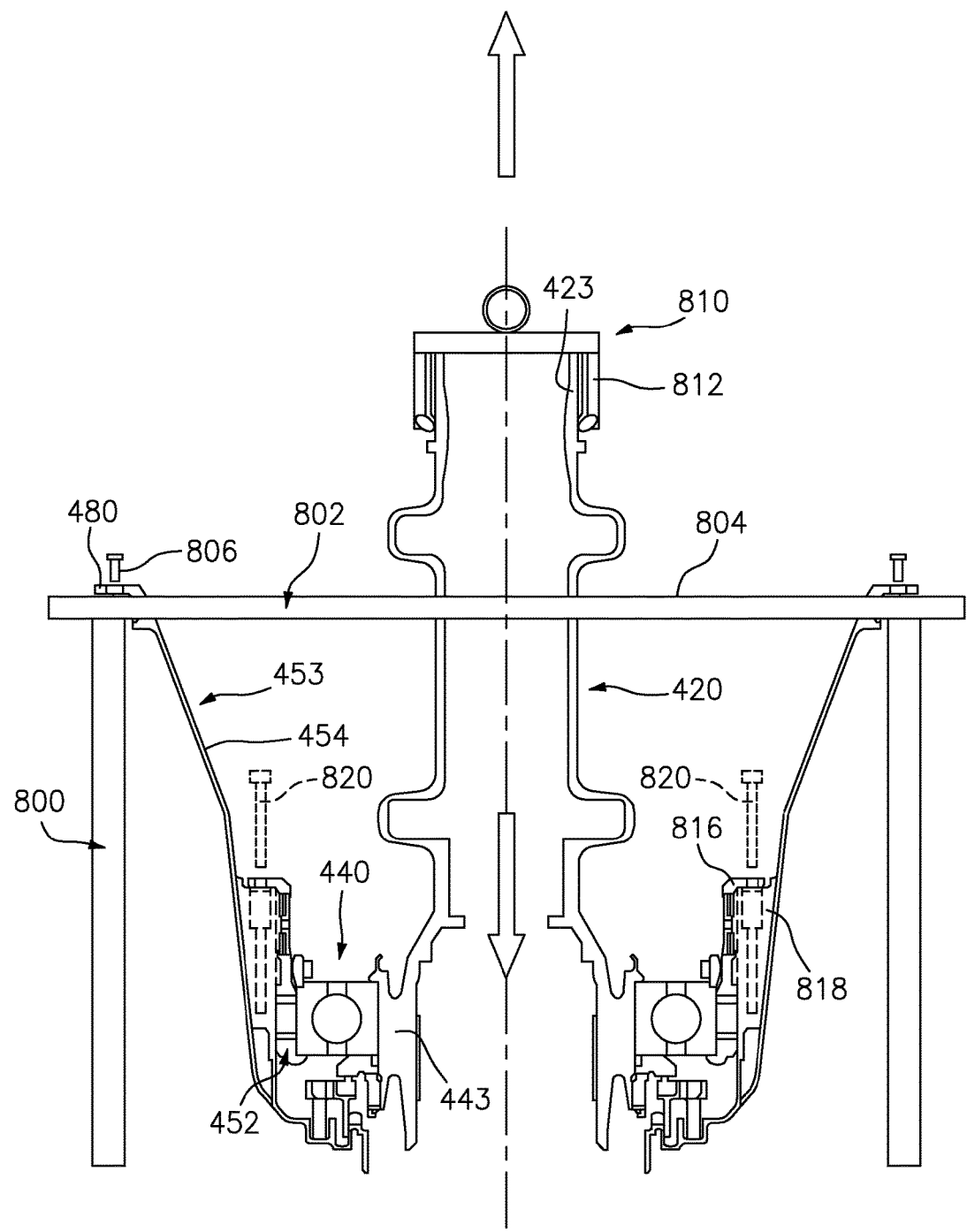
FIG. 6 is a partial, partially schematic view of an assembly stage.

In FIG. 6, the input shaft 420 has been preassembled to the thrust bearing 440 and the squirrel cage ring 452. The assembly is suspended by a lifting tool 810 engaging the shaft front end 423. The exemplary lifting tool 810 engages the exterior of the front end with a split ring end effector 812 having a split creating two jaws, each with an inwardly directed finger to engage and capture an underside (rear end) of any spline, thread, or the like at the end of the shaft. Alternative implementations in alternative engines may involve grasping from the interior of the shaft or may involve threaded or other engagement.

The bearing support 453 has been placed front-upward in a fixture 800 having an upper rim 802 with an upper surface 804. The rear face of the flange 480 rests against the upper surface 804 and the flange 480 may be temporarily secured in place via bolts 806. The aftward direction of the support extends downward through an aperture in the rim 802. The input shaft and bearing assembly is lowered (via a hoist engaging the tool 810) into place through the rim aperture and seated. For example, a flange 816 of the squirrel cage is seated with its aft surface against the forward surface of a flange or bosses 818 along the inner diameter (ID) face of the web 454. The flange 816 is then secured with a circumferential array of bolts 820 to assemble the shaft 420 and bearing 440 to the support 453.

This combined assembly may then be unbolted from the fixture 800 and lifted via the hoist. A second lifting tool 830 (FIG. 7) may then be installed to engage the opposite (rear) end 443 of the input shaft (e.g., via an externally-threaded portion 832 engaging an internal thread along the rear end portion 443). The tool 830 may be secured to a second hoist. By some combination of raising the second hoist and lowering the first hoist, the assembly may be inverted whereafter the lifting tool 810 may be disengaged from the input shaft. The bearing support and input shaft assembly is now ready for installation to the transmission.

Figure 8:
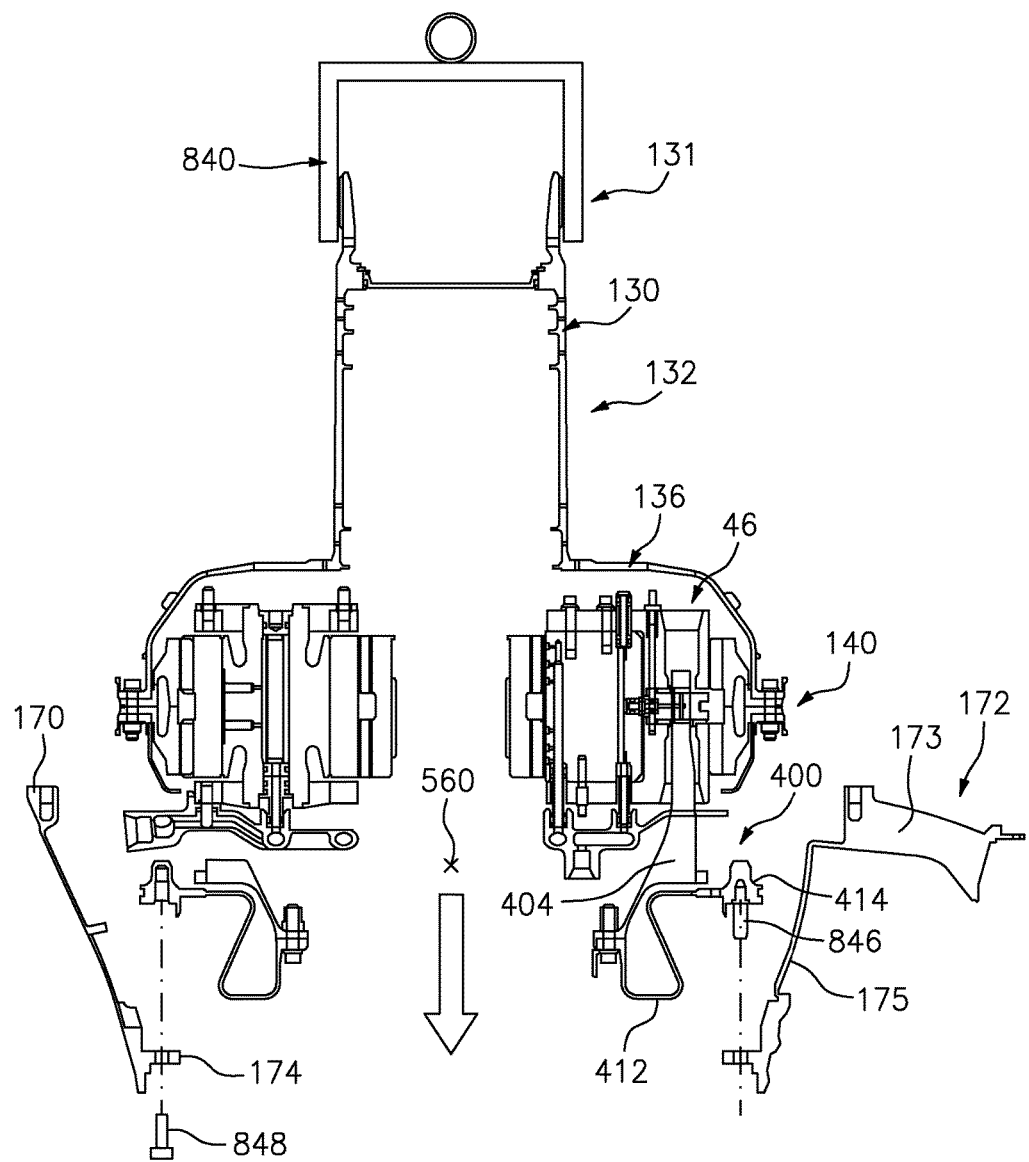
FIG. 8 is a partial, partially schematic view of another assembly stage.

A series of subassemblies including the transmission may be pre-prepared. FIG. 8 shows an initial subassembly including the transmission 46, fan shaft 132, and the flexure structure 400 along with its associated fingers and flange. This subassembly is held forward end up via a lifting tool 840 which is carried by a hoist (not shown). As discussed before, the exemplary lifting tool may engage an exterior portion and/or an interior portion of the shaft such as via threaded engagement or interfitting grasping. In order to receive this subassembly, the front frame assembly 172 has been preinstalled into a rotary trunion fixture (not shown) which may be rotated about a transverse/horizontal axis (schematically shown as 560 but potentially located in a variety of positions).

The front frame assembly is initially oriented front-up. The fan shaft and transmission subassembly is then lowered into place with the flange 414 initially being registered by dowel pins 846 interfitting with holes in the flange 174. The flanges 414 and 174 may then be secured to each other via a small number of work bolts 848 inserted from below through the flange 174 and into threaded features of the flange 414. Thereafter, the trunion fixture rotates 180° about its axis 560 to orient the front frame 172/transmission 46/fan shaft 132 combination front-downward to receive the bearing support and input shaft subassembly of FIG. 7.

Figure 7:
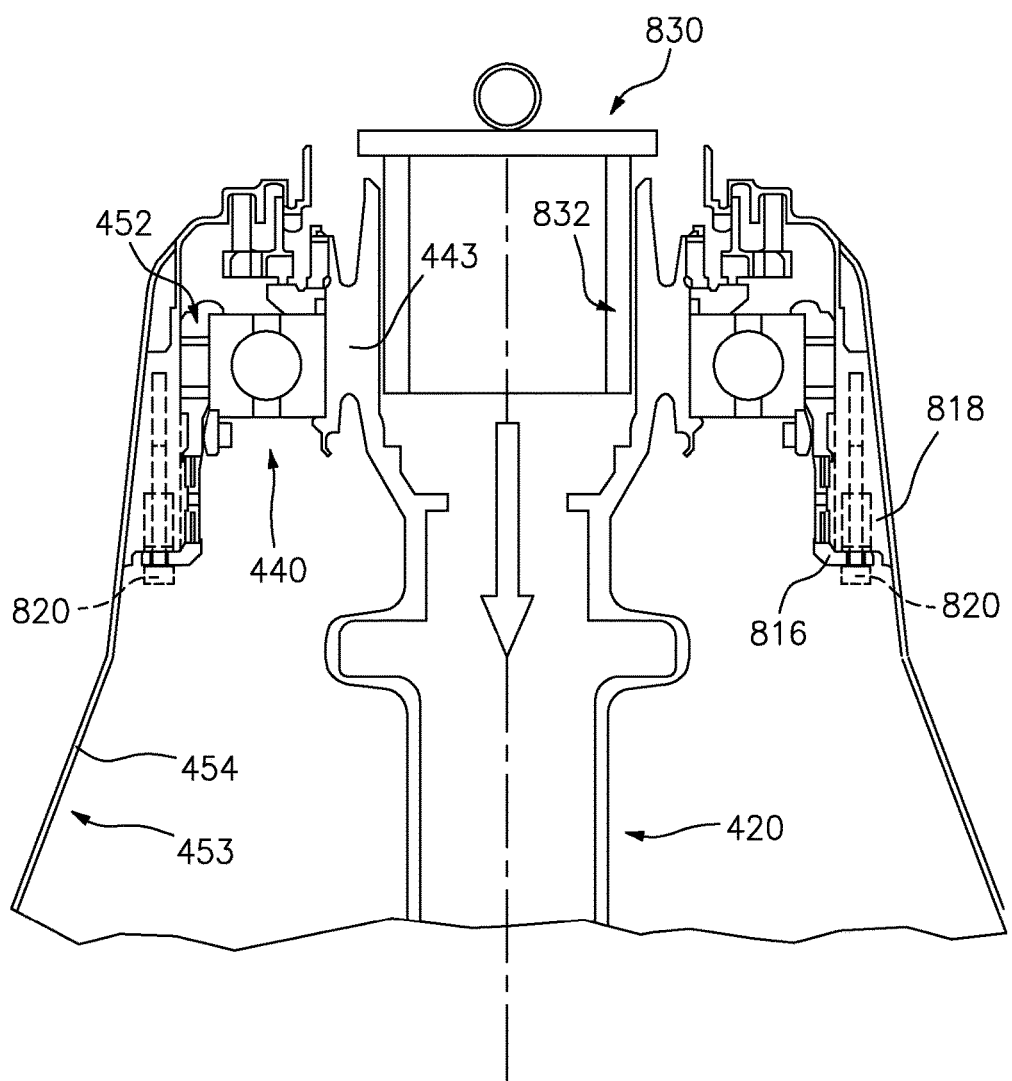
FIG. 7 is a partial, partially schematic view of another assembly stage.
Figure 9:
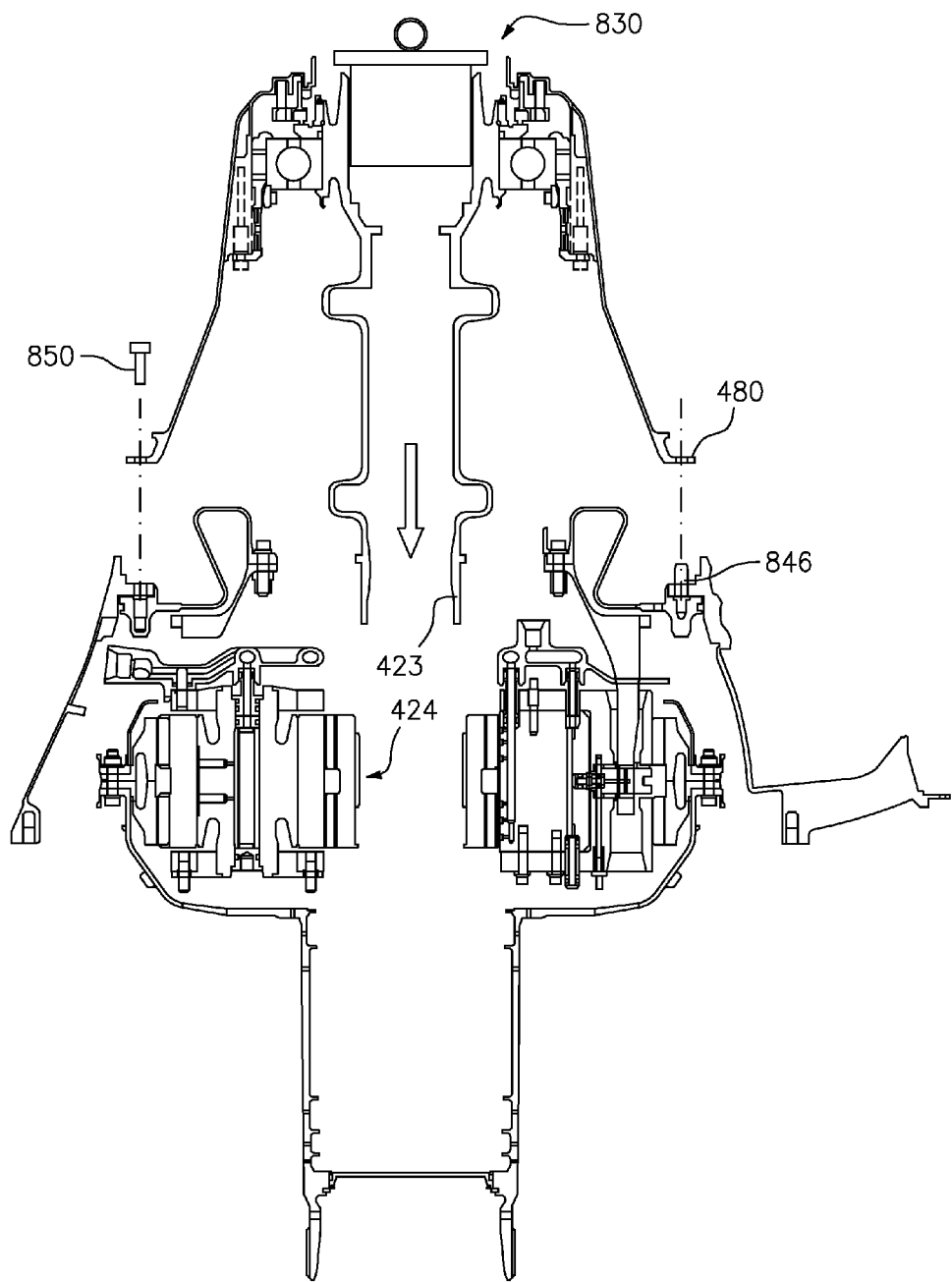
FIG. 9 is a partial, partially schematic view of another assembly stage.

The FIG. 7 subassembly is lowered into place in FIG. 9 with the engine flange 480 initially being registered by the same dowel pins 846 which had protruded downward from the flange 414 through the flange 174 but which now protrude upward. Further bolts 850 (e.g., a larger number such as an exemplary forty-eight) may now be inserted downward (forwardly in engine orientation) through the flange 480, the flange 174, and into threaded portions (e.g., shown as blind bosses protruding downward from a thinned portion of the flange and bearing thread inserts) of the flange 414 to provide the primary mechanical strength retaining these flanges together (the bolts 848 serving only for temporary holding during manufacture). This sequence of assembly and modularity allows, for example, the flexure flange 414 to be secured to the bearing support easily while the flexure is preassembled to the transmission. This is contrasted with bolting the flexure from the front wherein one would have to reach around the transmission to bolt the flexure flange to the bearing support.

Figure 10:
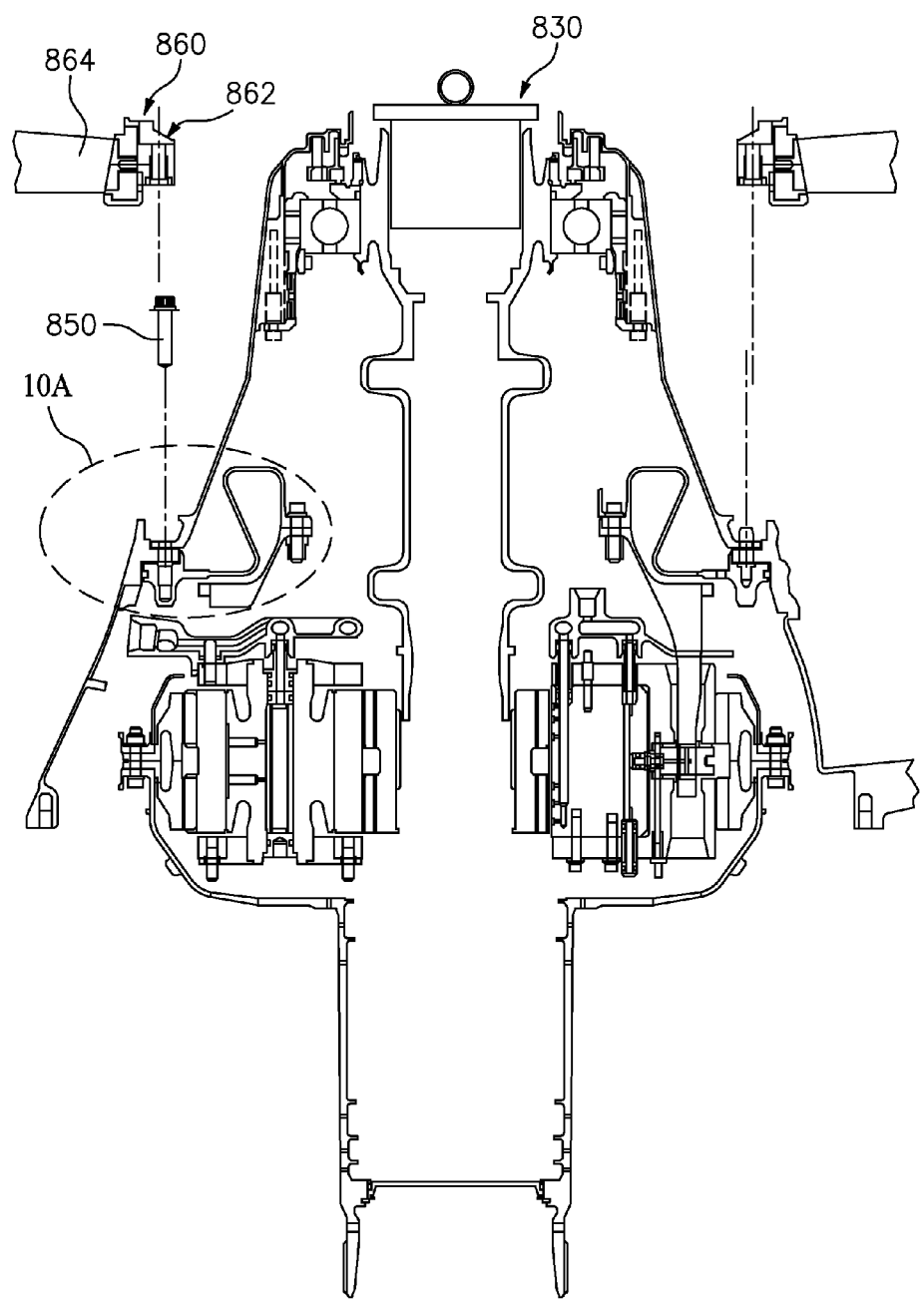
FIG. 10 is a partial, partially schematic view of another assembly stage.
Figure 10A:
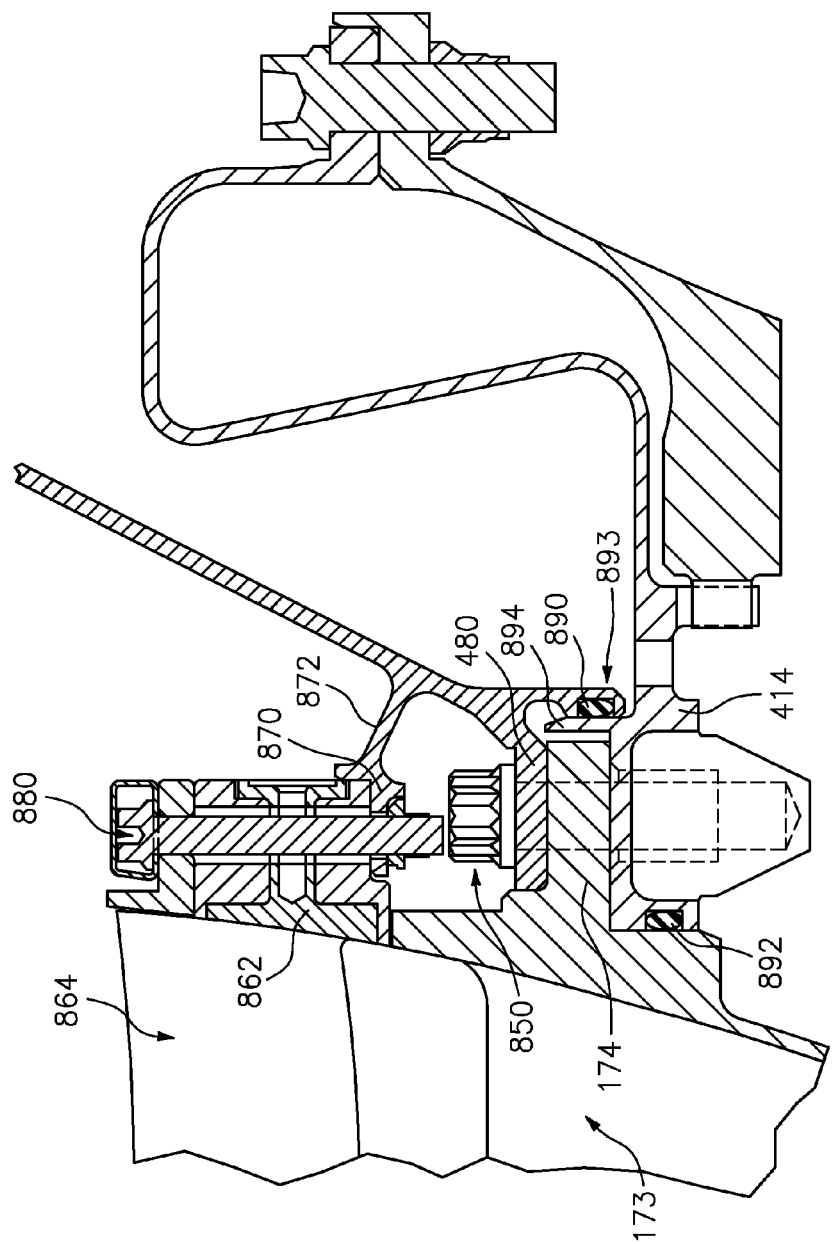
FIG. 10A is an enlarged view of a flange joint upon completion of the assembly step of FIG. 10.

FIG. 10 shows the bolts 850 being installed. It also shows inlet guide vane assembly 860 having an inner structure 862 and a plurality of vanes 864 extending outward therefrom (an outer structure not being illustrated). FIG. 10A shows the inner structure 862 being secured via several intervening sandwich rings to a scalloped/interrupted flange structure 870 of the bearing support at the distal end of a web 872 extending outward from the main web of the bearing support.

The flange structure 870 is spaced apart behind the flange 480 but is scallop/interrupted to provide access for tightening the heads of the bolts 850 prior to installation of the inlet guide vane assembly and its associated rings. The rings then cover the bolt heads and prevent further access. In some embodiments, the rings may then prevent excess backing out of the bolts 850 to retain them in case of failure. FIG. 10A shows a bolt 880 of a plurality of such bolts extending through the rings and the vane inboard mounting portion 862 and into the flange 870 and secured via associated nuts (which may be preinstalled on the flange).

Figure 11:
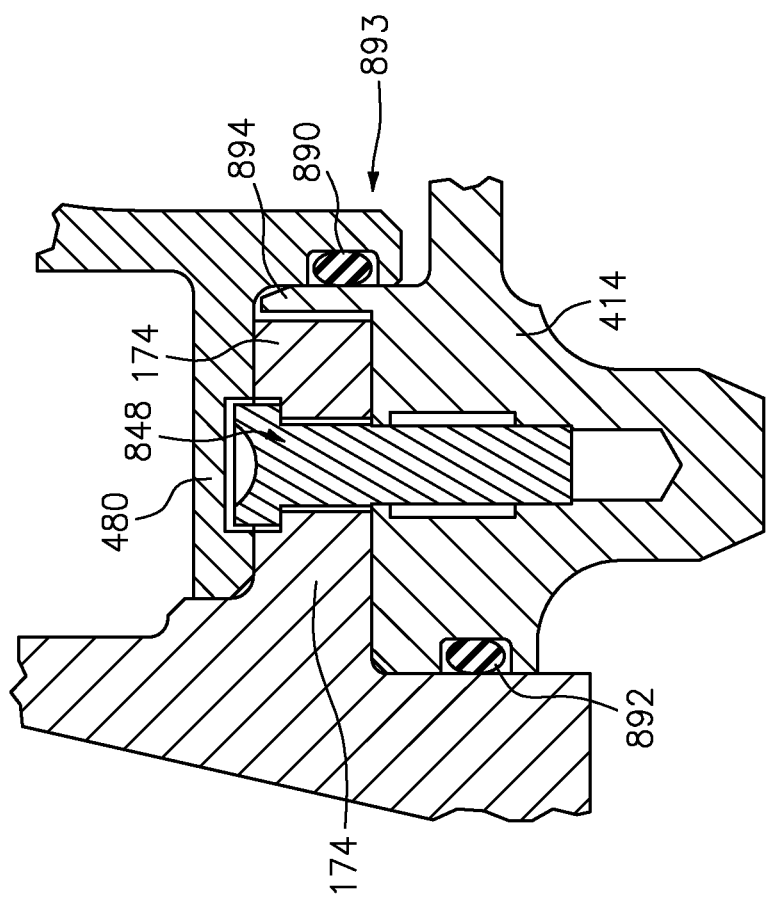
FIG. 11 is a partial section at like radius and axial position to FIG. 10A, but circumferentially offset.

For reference, FIG. 11 is a partial section at like radius and axial position to FIG. 10A, but circumferentially offset to show one of the work bolts 848. The exemplary work bolt head is only partially countersunk in the aft face of the flange 174 so that the protruding portion is accommodated in a blind compartment in the forward surface of the flange 480.

FIG. 10A further shows a pair of O-rings 890, 892 which seal between the front frame assembly and the bearing support. An inboard O-ring 890 is captured in a channel in a forwardly protruding collar portion 893 of the bearing support protruding forwardly of the flange 480 and facing a mated rearwardly protruding collar portion 894 of the flexure flange 414 protruding aft of its flat face. A second O-ring 892 outboard and forward seals between the outer diameter (OD) rim of the flexure flange (in this example it is captured in a channel in the OD rim) and an adjacent inner diameter (ID) face of the circumscribing inboard wall of the front frame assembly immediately forward of the front face of the flange 174. The remaining several steps may be as is known in the art in an appropriate manner to complete engine assembly.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing corresponding SI or other units, the parenthetical's units are a conversion and should not imply a degree of precision not found in the English units.

One or more embodiments have been described. Nevertheless, it will be understood that various modifications may be made. For example, when implemented in the reengineering of a baseline engine, details of the baseline may influence details of any particular implementation. Accordingly, other embodiments are within the scope of the following claims.

What is claimed is:

1. A method for assembling a turbofan engine (20), the engine comprising:
   an engine case (22);
   a gaspath through the engine case;
   a fan (42) having a circumferential array of fan blades (100);
   a fan case (40) encircling the fan blades radially outboard of the engine case;
   a plurality of fan case vanes (44) extending outward from the engine case to the fan case;
   a front frame assembly (172) comprising a plurality of vanes extending radially across the gas path;
   a shaft (420);
   a transmission (46) coupling the shaft (420) to a fan shaft (132) to drive the fan;
   a bearing assembly (176) coupling the shaft to the front frame assembly; and
   a bearing support (453) extending aftward and radially inward from the front frame assembly to the bearing assembly, the method comprising:
   coupling the bearing assembly (176) and the shaft (420) as a unit to the bearing support (453);
   installing the transmission (46) and the fan shaft (132) to the front frame assembly (172);
   installing the bearing assembly and shaft as a unit so that the shaft engages a central gear (52) of the transmission and the bearing support engages the front frame assembly.

2. The method of claim 1 further comprising installing an inlet guide vane assembly (860) after the bearing support is engaged to the front frame assembly.

3. The method of claim 1 wherein:
the shaft (420) is a coupling.

4. The method of claim 1 wherein:
the coupling of the bearing assembly and the shaft as a unit to the bearing support comprises lowering the bearing assembly and the shaft as a unit into the bearing support.

5. The method of claim 1 wherein:
the installing of the transmission and the fan shaft to the front frame assembly comprises lowering the transmission and the fan shaft.

6. The method of claim 5 wherein:
the installing the transmission and the fan shaft further comprises securing via bolts (848) inserted from below.

7. The method of claim 5 further comprising:
rotating the transmission and the fan shaft by 180° about a transverse axis (560) to orient the transmission and the fan shaft in a front-downward orientation in which the bearing assembly and shaft are installed.

8. The method of claim 1 wherein:
the installing the bearing assembly and shaft as a unit comprises lowering the bearing assembly and shaft.

9. A turbine engine subassembly or turbine engine comprising:
   a transmission (46);
   an output shaft (132) coupled to the transmission;
   an input shaft (420) coupled to the transmission;
   a fingered flexure (400) coupled to the transmission for resisting rotation of a gear carrier of the transmission;
   a front frame assembly (172) at least partially encircling the transmission;
   a bearing support (453); and
   a bearing (440) coupling the bearing support to the input shaft,
wherein:
   from forward to aft, respective flanges (414, 174, 480) of the fingered flexure, front frame assembly, and bearing support are secured in a sandwich with fasteners (850);
   a first O-ring (890) seals between a forwardly protruding collar portion (893) of the bearing support protruding forwardly of the bearing support flange (480) and a rearwardly protruding collar portion (894) of the flexure flange (414); and
   a second O-ring (892) seals between an outer diameter (OD) rim of the flexure flange and an adjacent inner diameter (ID) face of the front frame assembly.

10. The subassembly or engine of claim 9 wherein:
the fasteners (850) are head rearward/shank forward bolts; and
the bolts are engaged to threaded portions of the flange (414) of the fingered flexure, extending freely through holes in the flanges (480, 174) of the bearing support and front frame assembly.

11. The subassembly or engine of claim 9 wherein:
dowels (846) register the flanges together.

12. The subassembly or engine of claim 9 wherein:
additional bolts (848), smaller in count than the bolts, hold the flanges of the fingered flexure and the front frame assembly to each other but not the flange of the bearing support.

13. The turbine engine of claim 9 wherein:
the input shaft (420) is a coupling of a low shaft (25); and
the engine further includes a high shaft (24).

14. A turbine engine subassembly or turbine engine comprising:
a transmission (46);
an output shaft (132) coupled to the transmission;
an input shaft (420) coupled to the transmission;
a fingered flexure (400) coupled to the transmission for resisting rotation of a gear carrier of the transmission;
a front frame assembly (172) at least partially encircling the transmission;
a bearing support (453); and
a bearing (440) coupling the bearing support to the input shaft,
wherein:
from forward to aft, respective flanges (414, 174, 480) of the fingered flexure, front frame assembly, and bearing support are secured in a sandwich with bolts (850); and
additional bolts (848), smaller in count than the bolts, hold the flanges of the fingered flexure and the front frame assembly to each other but not the flange bearing support.

15. The subassembly or engine of claim 14 wherein:
dowels (846) register the flanges together.

* * * * *